United States Patent [19]

Shono et al.

[11] Patent Number: 5,599,605
[45] Date of Patent: Feb. 4, 1997

[54] MAGNETO-OPTICAL RECORDING MEDIUM AND METHOD FOR PRODUCING THE SAME

[75] Inventors: Keiji Shono; Ken Tamanoi; Sumio Kuroda; Koji Matsumoto, all of Kawasaki, Japan

[73] Assignee: Fujitsu Limited, Kawasaki, Japan

[21] Appl. No.: 45,737

[22] Filed: Apr. 14, 1993

[30] Foreign Application Priority Data

Apr. 17, 1992 [JP] Japan ................................. 4-096893
Feb. 25, 1993 [JP] Japan ................................. 5-036464

[51] Int. Cl.⁶ ........................... G11B 5/66; B32B 3/10
[52] U.S. Cl. ........................... 428/141; 428/694 ML; 428/694 GT; 428/694 EC; 428/694 MM; 428/900
[58] Field of Search .............. 428/694 GT, 694 ML, 428/694 EC, 900, 141, 694 MM

[56] References Cited

U.S. PATENT DOCUMENTS

| | | | |
|---|---|---|---|
| 4,645,722 | 2/1987 | Katayama et al. | 428/694 ML |
| 4,842,956 | 6/1989 | Kabayashi | 428/611 |
| 5,016,232 | 5/1991 | Tadokoro et al. | 369/13 |

FOREIGN PATENT DOCUMENTS 257648 11/1987 Japan.

OTHER PUBLICATIONS

"Multi-layered Garnet Films for High Density MO Memory", Itoh et al; Digests of the 10th Annual Conf. on Magnetics in Japan, 31. (1986).

*Primary Examiner*—Leszek Kiliman
*Attorney, Agent, or Firm*—Armstrong, Westerman, Hattori, McLeland & Naughton

[57] ABSTRACT

A magneto-optical recording medium having a recording layer made of a bismuth-substituted garnet and deposited by a sputtering over an amorphous substrate of aluminosilicate or borosilicate glass, the recording medium including a garnet underlayer of either a double-layer or single-layer structure. The formation of an underlayer of a double-layer structure made of garnet reduces the level of noise due to light scattering at crystalline boundaries in the garnet film. The formation of an underlayer of a single-layer structure made of a garnet having a lower crystallization temperature than a YIG film is also effective to noise-level reduction. An underlayer has a surface smoothness corresponding to a roughness of approximately 10 Å, which is improved from the surface smoothness of a conventional underlayer comprising a YIG film.

11 Claims, 8 Drawing Sheets

MAGNETO-OPTICAL RECORDING MEDIUM AND METHOD FOR PRODUCING THE SAME

BACKGROUND OF THE INVENTION

1. Field of the Invention

The present invention relates to a magneto-optical recording medium having a recording layer made of a garnet, and particularly, to a magneto-optical recording medium having a garnet recording layer formed on an amorphous substrate such as a glass substrate. The present invention also relates to a method for producing such a magneto-optical recording medium.

2. Description of Related Art

A garnet thin film containing yttrium (Y) or a rare-earth element and bismuth (Bi) substituting part of these elements is regarded as an attractive material for forming a high-density magneto-optical recording medium because the film is able to provide large Faraday rotation with respect to visible light within a short-wavelength region, and to exhibit excellent perpendicular magnetic properties.

On an experimental basis, a substrate made of a gadolinium-gallium-garnet (GGG) crystal is used as a substrate on which such a garnet thin film is to be formed, and a bismuth-substituted garnet film having good crystallographic properties is formed on the substrate. A GGG substrate, which is made of a single crystal and which has better thermal resistance than a glass substrate, enables the epitaxial growth of a garnet film at a relatively high temperature. If an ideal substrate, such as a substrate of a GGG crystal, is used, it is possible to obtain a magneto-optical recording medium having a low-noise bismuth-substituted garnet recording layer. However, GGG crystals are expensive, and cannot be readily used in practice as substrates of magneto-optical recording media.

A bismuth-substituted garnet film of the above-described type is usually formed by a sputtering method. However, a garnet film having good crystallographic properties cannot be directly obtained by depositing a film on an amorphous substrate, such as a glass substrate, by sputtering a film-forming material. To cope with this problem, the following process is conducted: a bismuth-substituted garnet film deposited on a glass substrate by a sputtering method is crystallized by subjecting the film to post heat treatment effected under certain conditions with which the glass substrate is prevented from softening. However, a garnet film resulting from this post heat treatment is composed of crystallites having irregular crystallographic orientations. As a result, a recording layer comprising the thus obtained bismuth-substituted garnet film entails the generation of great noise due to light scattering by crystalline boundaries. Noise generated from a magneto-optical recording medium falls into two categories: noise caused by light scattering such as above; and noise caused by non-uniformness of magnetic properties, more specifically, non-uniformness of Faraday effect. In this specification, the term "noise" refers to noise of the former category unless otherwise specified.

The present applicant has previously proposed in Japanese Patent Application No. 3-219695, a method comprising: depositing an amorphous film having a chemical composition corresponding to yttrium-iron-garnet (YIG) and expressed by a chemical formula $Y_3Fe_5O_{12}$, that is, a YIG precursor film, on the surface of a glass substrate by a sputtering method; crystallizing the film by heat treatment; and depositing, on the crystallized underlayer, a bismuth-substituted garnet film expressed by a chemical formula of, for example, $Bi_2DyGa_{0.8}Fe_{4.2}O_{12}$. The formation of the underlayer reduces the level of noise from the level obtainable with a bismuth-substituted garnet film directly formed on a glass substrate.

An underlayer of a garnet, such as a YIG underlayer, facilitates the growth thereon of a bismuth-substituted garnet film having relatively good crystallographic properties. However, the disclosure of the above-identified application states that the level of noise is not reduced if the YIG underlayer has poor crystallographic properties, and the underlayer must be made of a garnet having a chemical composition containing completely no bismuth, as in the case of the YIG film, or only a very small amount of bismuth. This is because if the YIG film has poor crystallographic properties, it is not possible to grow on the YIG film a bismuth-substituted garnet film having good crystallographic properties.

Also, according to the above disclosure, heat treatment at a temperature of not less than 700° C. is necessary in order to crystallize an amorphous film having a chemical composition containing no bismuth, as in the case of the YIG precursor film, and rapidly heating the YIG precursor film with an infrared lamp is effective in order to prevent long-period heat-treatment at such a temperature from causing the glass substrate to soften and be deformed. The disclosure proposes heat treatment conditions in which temperature is raised to 700° C. at a speed of 10° C./second, and then retained at 700° C. for 2 minutes.

As shown in FIG. 11, the level of noise (noise due to light scattering) evaluated by forming an aluminum reflecting film on a YIG underlayer crystallized in the heat-treatment conditions proposed in the above disclosure, is still relatively high. Specifically, this level of noise is approximately three times higher than the level of noise obtainable by forming an aluminum reflecting film directly on a glass substrate. Such a high noise level is higher than the acceptable upper limit of the level of noise generated from a magneto-optical recording medium, and is considered to be exhibited even when a recording layer of a bismuth-substituted garnet is deposited on the underlayer. The evaluation data suggests that, in view of practical use, it is important to prepare, for recording layer formation, an underlayer having a further reduced noise level. The noise data shown in FIG. 11 is obtained through measurement with a spectrum analyzer.

According to the results of observation using a differential interference microscope, a crystallized YIG film serving as the underlayer has a substantially completely smooth surface free from any recognizable unevenness. However, with a scanning electron microscope having a higher resolution, it has been observed that the YIG film is composed of crystallite grains having a grain size of several microns. Further, it has been found from observation using an atomic force microscope that the YIG film has an average surface roughness of not less than 40 Å.

As have been shown by the results of observation through the various types of microscopes, noise is generated due to light scattering even with a garnet film formed on a glass substrate and having a surface whose roughness is only of the order of 40 Å which cannot be optically detected. Based on this fact, a structure of an underlayer that assures a smoother surface and a method for forming such a structure is considered to be essential.

SUMMARY OF THE INVENTION

An object of the present invention is to provide a magneto-optical recording medium having a bismuth-substituted garnet recording layer that incurs low costs and is thus fit for practical use.

Another object of the present invention is to reduce the level of noise of a magneto-optical recording medium having a bismuth-substituted garnet recording layer formed on a glass substrate.

A further object of the present invention is to provide an improved underlayer and a method for forming the underlayer in order to reduce the level of noise.

To achieve these objects, a magneto-optical recording medium according to the present invention has a substrate made of an amorphous material, such as glass, and a bismuth-substituted garnet recording layer, and includes an underlayer on which the recording layer is formed. The underlayer is constructed as either a double-layer structure or a single-layer structure made of a garnet having a crystallization temperature lower than the softening point of the material forming the substrate. A double-layer structure may include a lower sub-underlayer formed by using a garnet precursor film which is not crystallized by heat treatment for crystallizing an upper sub-underlayer. A double-layer structure may include an upper sub-underlayer comprising a garnet film which is nonmagnetic at normal temperature.

Each of the lower and upper sub-underlayers may have a composition represented by a chemical formula $A_xR_{3-x}M_zFe_{5-z}O_{12}$, where R indicates yttrium (Y) or a rare earth element, A indicates a rare earth element other than R and M indicates a metallic element selected from the third group of the periodic table. The upper sub-underlayers may be a non-magnetic bismuth (Bi)-substituted garnet having a composition represented by a chemical formula $Bi_xR_{3-x}M_zFe_{5-z}O_{12}$, where x and z have values defined by $0<x<3$ and $1.5 \leq z<5$, respectively, R indicates an element selected from the group consisting of yttrium (Y) and rare earth elements and M indicates a metallic element selected from the third group of the periodic table. The lower sub-underlayer or the underlayer of a single-layer structure may be made of a garnet containing aluminum (Al) substituting for a part of iron (Fe), having a composition represented by a chemical formula $A_xR_{3-x}Al_zFe_{5-z}O_{12}$, where x and z have values defined by $0 \leq x \leq 3$ and $0<z<5$, respectively, R indicates yttrium (Y) or a rare earth element and A indicates a rare earth element other than R.

The recording layer has orientation perpendicular to the surface of substrate regarding the axis of easy magnetization and may be made of a bismuth (Bi)-substituted garnet having a composition represented by a chemical formula $Bi_xR_{3-x}M_zFe_{5-z}O_{12}$, where x and z have values defined by $0<x<3$ and $0 \leq z<1$, respectively, R indicates an element selected from the group consisting of yttrium (Y) and rare earth elements and M indicates a metallic element selected from the third group of the periodic table.

To further achieve the above objects, a method for producing a magneto-optical recording medium according to the present invention includes the steps of: depositing, by a sputtering method, an underlayer on an amorphous substrate such as a glass substrate; and crystallizing the underlayer by heat-treatment. When the underlayer is deposited on the substrate by effecting sputtering in an inert atmosphere, the underlayer is crystallized by heat-treating the underlayer in an oxidizing atmosphere. When the underlayer is deposited on the substrate by effecting sputtering in an oxidizing atmosphere, the underlayer is crystallized by heat-treating the underlayer in an inert atmosphere, the heat treatment in this case preferably employing an oxidizing atmosphere containing 10 to 1000 ppm of oxidizing gas. In either case, the heat treatment employs heat treatment conditions comprising a temperature rise speed of not less than 5° C./sec, a temperature difference between the maximum heat-treatment temperature and the crystallization temperature of the garnet precursor to be crystallized of not more than 40° C., and a retention period for retaining temperatures above the crystallization temperature of not more than 60 seconds.

With the above-described double-layer structure, a YIG film or a garnet film containing a relatively large amount of bismuth, which has been unfit for use as an underlayer having a single-layer structure, can be used as an upper sub-underlayer to enable noise-level reduction. In the case of a double-layer structure, the formation of a lower sub-underlayer permits an upper sub-underlayer, which is formed by crystallization effected simultaneously with deposition over the substrate kept at a high temperature, to also have a low noise level. An underlayer having a single-layer structure and comprising a garnet film having a crystallization temperature lower than the softening point of the glass substrate has a low noise level. An underlayer crystallized by heat treatment which is quicker and shorter than conventional heat treatment and which is so controlled as to prevent the underlayer from being exposed to an excessively high temperature, has a low noise level. When an underlayer includes an upper sub-underlayer comprising a nonmagnetic garnet film, the upper sub-underlayer prevents a magnetic exchange interaction between the lower sub-underlayer and the recording layer, thereby providing the effect of reducing the level of noise due to the fluctuation of the plane of polarization caused by in-plane magnetization components (magnetization components parallel to the substrate surface).

DESCRIPTION OF THE PREFERRED EMBODIMENTS

Figure 1:
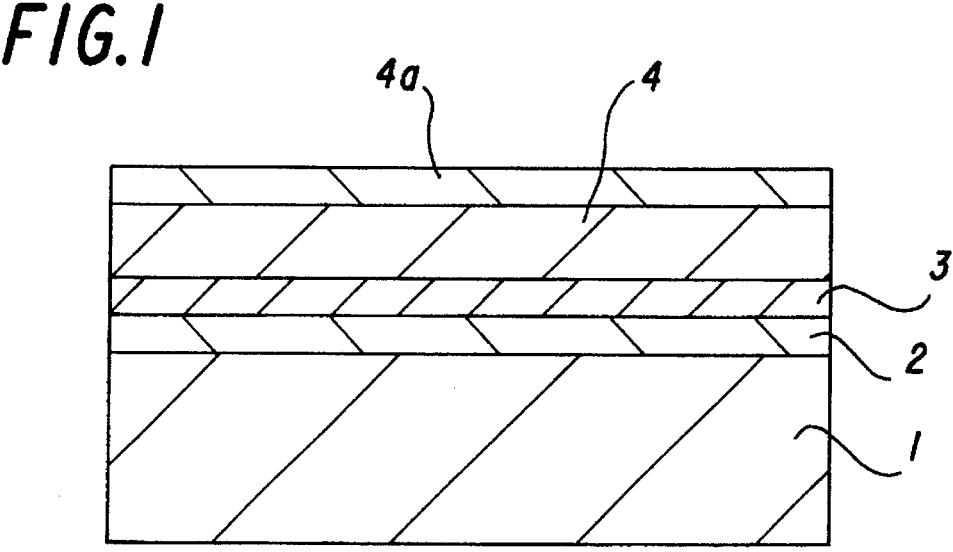
FIG. 1 is a schematic sectional view of a magneto-optical recording medium according to a first embodiment of the present invention.

Referring to FIG. 1, a schematic sectional view showing a magneto-optical recording medium according to a first embodiment of the present invention, the magneto-optical recording medium has an amorphous substrate 1 made of a glass, a first sub-underlayer 2 made of an amorphous garnet precursor, a second sub-underlayer 3 made of a crystalline garnet, and a recording layer 4 made of a bismuth-substituted garnet, the sub-underlayers 2 and 3 (together constituting an underlayer) and the recording layer 4 being subsequently formed on one surface of the substrate 1. The recording layer 4 is covered with an aluminum reflecting film 4a formed thereon.

The magneto-optical recording medium shown in FIG. 1 was produced by the following processes:

A substrate 1 which was made of aluminosilicate glass (e.g., product code "NA40" marketed by Hoya Corp. or product code "AN" marketed by Asahi Glass Co.,) and which had a diameter of 3 inches and a thickness of 1.2 mm, was prepared. A yttrium-gallium-garnet (YGG) precursor film having a thickness of 0.05 μm and a chemical composition expressed as $Y_3Ga_5O_{12}$, and a yttrium-iron-garnet (YIG) precursor film having a thickness of 0.1 μm and a chemical composition expressed as $Y_3Fe_5O_{12}$ were subsequently deposited on one surface of the substrate 1 by a radio-frequency magnetron sputtering method. The sputtering was effected in an atmosphere containing either only argon or argon and oxygen added thereto at a certain ratio (e.g., a volumetric ratio of 10%) while the substrate 1 was kept at 300° C.

Figure 5:
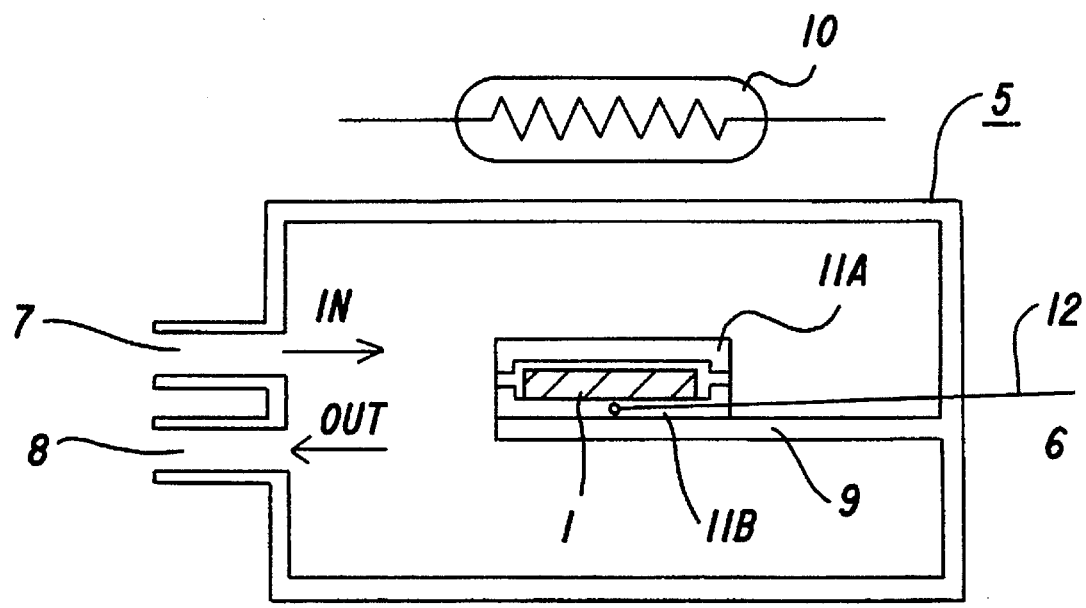
FIG. 5 is a schematic sectional view showing the construction of a heating apparatus used in heat treatment in a process for producing a magneto-optical recording medium according to the present invention.

Subsequently, the YIG precursor film was selectively crystallized by heat treatment. The heat treatment was effected by employing a heating apparatus 5 (model "RTA-94/44-S of Shinku-Rikou) having an infrared lamp 10 serving as a heat source, as shown in FIG. 5. The heating apparatus 5 had a box 11 supported by a quartz plate 9, and the substrate 1 was placed inside the box 11 with the surface of the substrate 1 formed with the YGG precursor film and the YIG precursor film directed upward. The box 11 had an upper cover 11a and a bottom plate 11b, both made of graphite. The heating apparatus 5 also had a thermocouple 12 for measuring the temperature within the box 11.

Figure 6A:
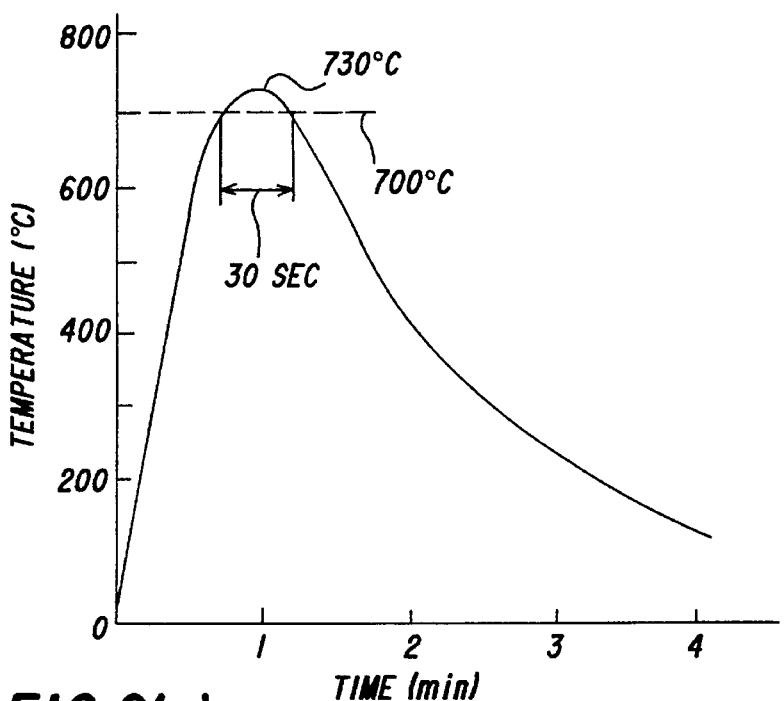
FIG. 6(a) is a graph showing a typical temperature profile of heat treatment in a production process for a magneto-optical recording medium according to the present invention.

FIG. 6(a) shows a typical temperature profile of the heat treatment. As shown in the drawing, the heat treatment employs a temperature rise speed of 20° C./sec, and a maximum temperature of 730° C. A YIG precursor film of the above-described type crystallizes at a temperature of approximately 700° C. The temperature profile shown in FIG. 6(a), therefore, maintains the YIG precursor film at temperatures above crystallization temperature of the film for a period of approximately 30 seconds. In order to control the crystallization period into such a short period of time, when a temperature of 650° C. has been reached in the temperature rise process, either nitrogen or nitrogen mixed with a small amount of oxygen is introduced at a flow rate of 80 liters/sec into a chamber 6 of the heating apparatus 5 through a gas inlet pipe 7. After the start of this nitrogen introduction, the temperature further rises, reaches 730° C., and thereafter rapidly lowers. The YGG precursor film, which has a relatively high crystallization temperature of 800° C., is not crystallized by the above heat treatment.

The substrate 1 is preferably made of a glass containing no alkali component, such as sodium, in view of certain heat resisting properties which render the substrate 1 unaffected by the above heat treatment, that is, an appropriate softening point and an appropriate coefficient of thermal expansion. Borosilicate glass is usable besides aluminosilicate glass. Quartz glass, having a great difference in coefficient of thermal expansion from a garnet film though having excellent heat resistance, is not suitable.

A gas to be introduced into the chamber 6 of the heating apparatus 5 in the above heat treatment is selected in the following manner: When the YIG precursor film has been formed by effecting sputtering in a mixed gas atmosphere containing argon and 1 to 50% (by volume) of oxygen, heat treatment for crystallizing the YIG precursor film may be effected in an inert atmosphere, such as a pure-nitrogen atmosphere. The present inventors have confirmed by x-ray analysis that the thus crystallized film contains no crystal having different phase from YIG. On the other hand, when the YIG precursor film has been formed by effecting sputtering in a pure-argon gas atmosphere, since the precursor film is in a state of being short of oxygen, heat treatment for crystallizing the YIG precursor film is effected in an oxidizing atmosphere. In this case, the interior of the chamber 6 of the heating apparatus 5 is additionally supplied with a mixed gas containing, for example, nitrogen supplied at a flow rate of 2 liters/min and oxygen supplied at a flow rate of 6 milliliters/min. A heat-treatment atmosphere of the oxidizing type preferably contains oxygen at a proportion of 10 to 1000 ppm. The present inventors have confirmed through experiments that if the oxygen proportion is below 10 ppm, the oxygen shortage of the crystallized film cannot be adequately compensated for, resulting in the existence of crystals in different phase from YIG, and that if the oxygen proportion is above 1000 ppm, the achievement of crystallization is difficult for heat treatment having a maximum temperature of 730° C. and a relatively short retention period of not more than 60 seconds. The present inventors have also confirmed that an atmosphere, such as air, containing oxygen at a high concentration requires a high crystallization temperature, and the thus crystallized film has poor smoothness.

Figure 6B:
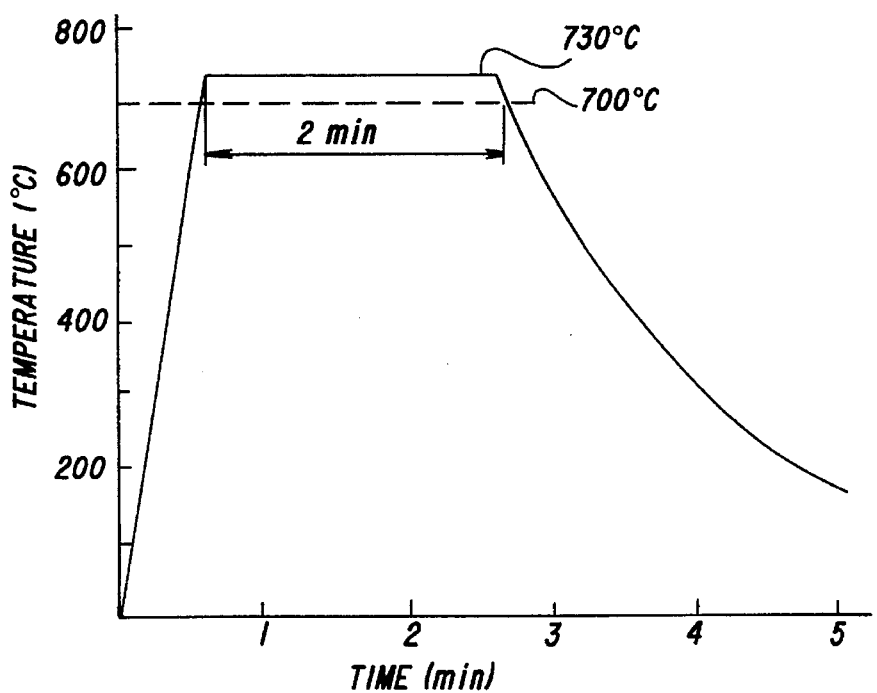
FIG. 6(b) is a graph showing a temperature profile of heat treatment of a conventional method for producing a magneto-optical recording medium.
Figure 7A:
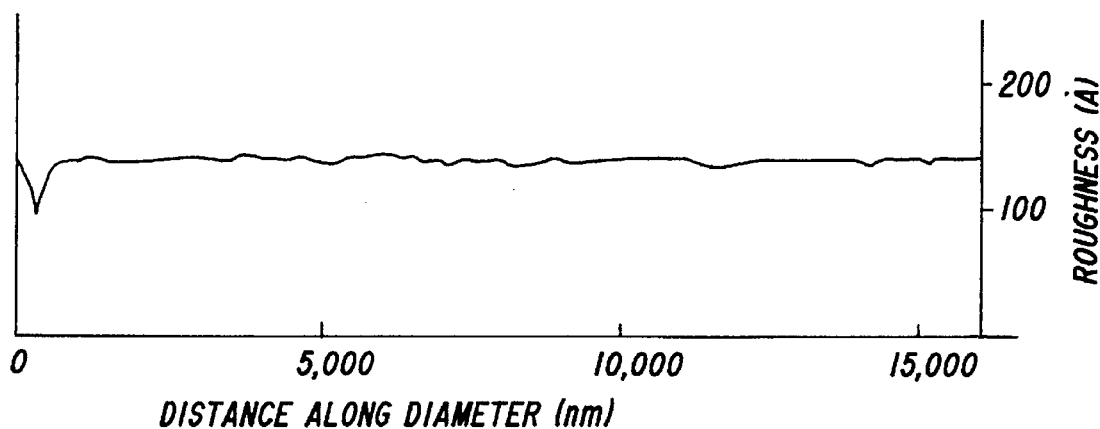
FIG. 7(a) is a graph showing the smoothness of the surface of a YIG film crystallized under heat treatment conditions according to the present invention.
Figure 7B:
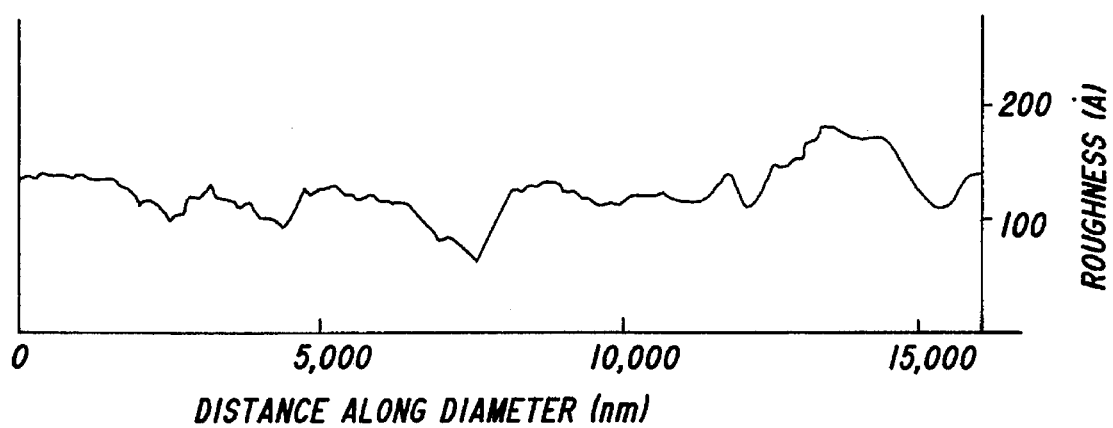
FIG. 7(b) is a graph showing the smoothness of the ace of a conventional YIG film crystallized under conventional heat treatment conditions.

FIG. 7(a) shows the results of evaluating the surface smoothness of the crystallized YIG film on the amorphous YGG precursor film by using an atomic force microscope (AFM). FIG. 7(b) shows, for the purpose of comparison, the results of evaluating the surface smoothness of a conventional crystalline YIG film directly formed on a glass substrate by a conventional method. The conventional YIG film was formed by depositing a YIG precursor film on a glass substrate without no amorphous YGG precursor film interposed, and by crystallizing the YIG precursor film by effecting heat treatment in a nitrogen atmosphere containing 3000 ppm of oxygen. The heat treatment of the conventional YIG film had the temperature profile shown in FIG. 6(b), in which the YIG precursor film was maintained at temperatures above its crystallization temperature, that is, above approximately 700° C., for 2 minutes.

When the results shown in FIG. 7(a) are compared with those shown in FIG. 7(b), it is seen that the YIG film according to the present invention has an average surface roughness of approximately 10 Å whereas the conventional YIG film directly formed on a glass substrate has an average surface roughness of approximately 100 Å. These results and the results of the above-described x-ray analysis mean that a double-layer structure according to the present invention makes it possible to form a crystalline underlayer having an excellent surface smoothness even with heat treatment for a short period of time. This fact is important because it suggests, in contrast with the general tendency in which, as the heat treatment period increases, crystal growth is promoted leading to impaired surface smoothness, a method for forming an underlayer having good crystallographic properties without sacrificing surface smoothness.

The present inventors have also examined the influences of the temperature rise speed and the maximum temperature of infrared-lamp heat treatment on the YIG precursor film on the YGG precursor film. If the temperature rise speed is lower than 5° C./minute, it is not possible to obtain a YIG film having good crystallographic properties. This is because, when the temperature rise speed is below the above level, the whole substrate is heated, thereby lengthening the retention period for retaining temperature above the crystallization temperature, e.g., 700° C. As a result, the advantages of short-period heat treatment having a retention period of not more than 1 minute cannot be obtained. Moreover, the glass substrate may soften, thereby making higher the risk of diffusion between the substrate and the YIG film. On the other hand, if the temperature rise speed is above 5° C./min, variations in the temperature rise speed cause substantially no difference in the surface smoothness of the YIG film. Normally, the maximum possible temperature rise speed, limited by the heating ability of the infrared lamp and the heat capacity of the graphite upper cover $11a$ and the graphite bottom plate $11b$, has been 100° C./min. It has been found that if the difference between the crystallization temperature of the YIG precursor film and the maximum temperature of the heat treatment is above 40° C. the surface smoothness of the YIG film deteriorates. This means that an excessively high maximum temperature of the heat treatment is not preferable. Thus, it is important that the temperature profile of the heat treatment be set such that the temperature rise speed is as high as possible and the maximum temperature is as close as possible to the relevant crystallization temperature.

Figure 8A:
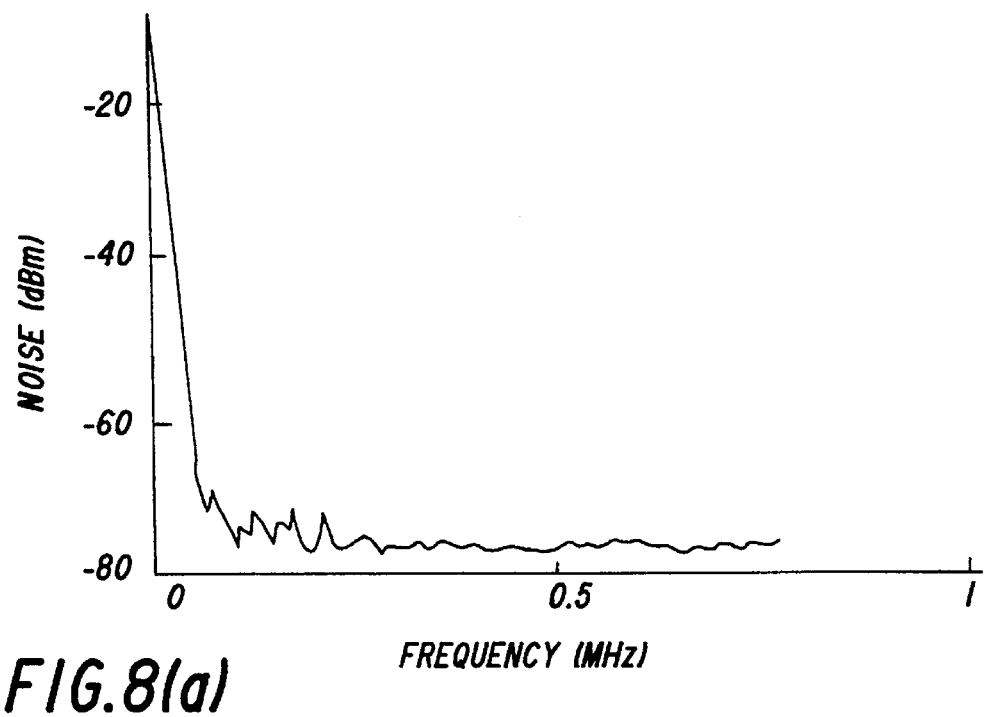
FIG. 8(a) is a graph showing the noise spectrum of the YIG film shown in FIG. 7(a)
Figure 8B:
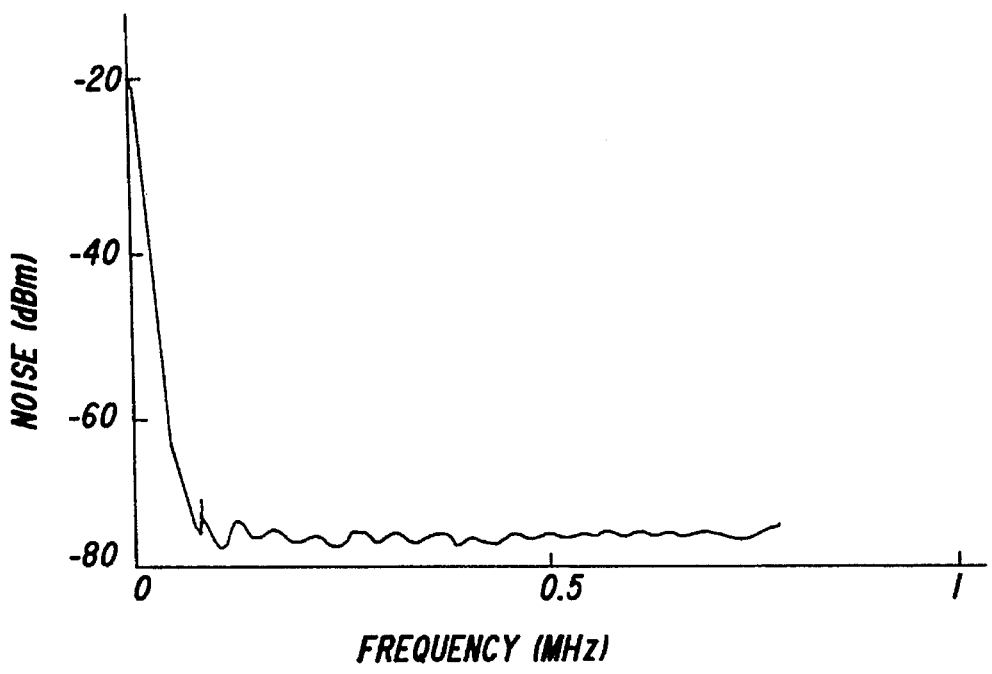
FIG. 8(b) is a graph showing the noise spectrum of an aluminum film formed on a glass substrate.

FIG. 8(a) shows the noise spectrum evaluated by forming a 0.1 μm-thick aluminum reflecting film on the crystallized YIG film on the YGG precursor film. The data was obtained by using a magneto-optical disk drive sold in the market, the disk drive having a light source comprising a semiconductor laser of a wavelength of 780 nm. FIG. 8(b) shows the noise spectrum, evaluated for the purpose of comparison, concerning an aluminosilicate glass substrate having a surface on which an aluminum reflecting film is formed. FIGS. 8(a) and 8(b) show substantially the same noise level. It is understood from the results of the evaluation that the above-described heat treatment makes it possible to obtain a YIG film which has substantially the same surface smoothness as a glass substrate and which is free from the influence of crystalline boundaries.

The foregoing description shows an example of an underlayer of a double-layer structure which comprises a combination of a YGG precursor film and a YIG film. However, the first sub-underlayer 2 may comprise another gallium garnet precursor film in which all or part of yttrium is substituted by a rare-earth element. The second sub-underlayer 3 may comprise a yttrium-iron-garnet film in which all or part of yttrium is substituted by a rare-earth element.

A recording layer 4 made of a bismuth-substituted garnet having a chemical composition of, for example, $Bi_2DyGa_{0.8}Fe_{4.2}O_{12}$, was deposited on the double-layer structure underlayer by a method such as that disclosed in Japanese Patent Application (filed by the present applicant) Laid-Open No. 2-239448. Further, an aluminum reflecting film $4a$ was formed on the recording layer 4, thereby completing a magneto-optical recording medium according to the present invention. The bismuth-substituted garnet recording layer 4 was deposited over the substrate 1 by a sputtering method while the substrate 1 was kept at a relatively high temperature. The sputtering was effected in the following conditions: A radio-frequency magnetron sputtering apparatus was used; a sputtering atmosphere comprising an argon atmosphere having a pressure of 1.3 Pa and containing 10% by volume of oxygen is used; a substrate temperature during sputtering of 550° C. was used; and high-frequency power of 200 W was supplied.

When the substrate temperature is as high as 550° C. the resultant bismuth-substituted garnet recording layer 4, thus deposited above the crystallized YIG film sub-underlayer 2 on the surface of the substrate 1, has good crystallographic properties even if the recording layer 4 is not subjected to post heat treatment, and can be used to provide a low-noise magneto-optical recording medium.

Figure 2:
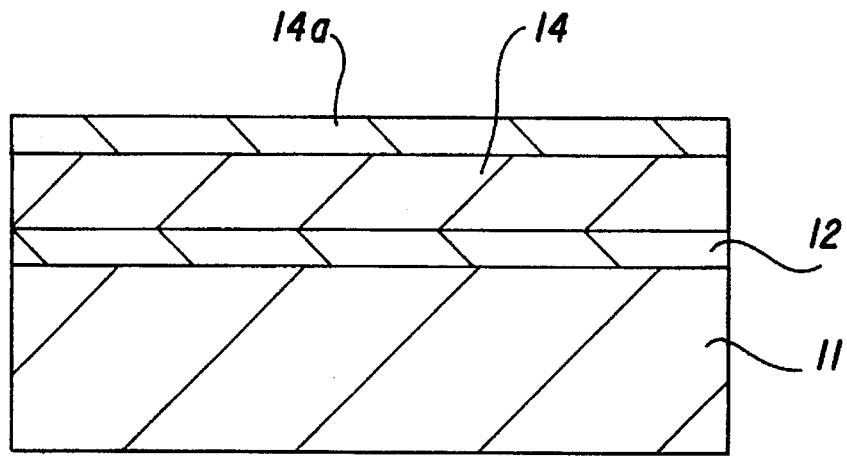
FIG. 2 is a schematic sectional view of a magneto-optical recording medium according to a second embodiment of the present invention.

FIG. 2 shows, in a schematic sectional view, a magneto-optical recording medium according to a second embodiment of the present invention. The magneto-optical recording medium has an amorphous substrate 11 made of a glass, an underlayer 12 made of a crystalline aluminum-substituted garnet, and a recording layer 14 made of a bismuth-substituted garnet, the underlayer 12 and the recording layer 14 being subsequently formed on one surface of the substrate 11. The recording layer 14 is covered with an aluminum reflecting film $14a$ formed thereon.

The magneto-optical recording medium shown in FIG. 2 was produced by the following processes:

An aluminum-substituted yttrium-iron-garnet (hereinafter referred to "aluminum-substituted YIG") precursor film having a thickness of 0.1 μm and a chemical composition expressed as $Y_3AlFe_4O_{12}$ was deposited by a sputtering method on one surface of a substrate 11 of the same type as the substrate 1 of the first embodiment. The aluminum-substituted YIG precursor film was amorphous. The sputtering was effected under conditions mainly comprising the following: A radio-frequency magnetron sputtering apparatus was used; a sputtering atmosphere comprising 1.3 Pa argon was used; a substrate temperature during sputtering of 300° C. was used; and a high-frequency power of 400 W was supplied.

The substrate 11, on the surface of which the aluminum-substituted YIG precursor film had been formed, was heat-treated by a heating apparatus 5 such as that shown in FIG. 5 and in accordance with the temperature profile shown in FIG. 6(a), thereby converting the precursor film into a crystalline aluminum-substituted YIG film. However, since the aluminum-substituted YIG precursor film had a crystallization temperature of approximately 680° C., the maximum temperature of the heat treatment was set to 710° C., and the retention period for retaining temperature above 680° C. was set at 30 seconds. Subsequently, a recording layer 14 made of a bismuth-substituted garnet was formed on the thus crystallized aluminum-substituted YIG film by a sputtering method. The sputtering employed the same conditions as those of the sputtering for forming the recording layer 4 in the first embodiment.

As described above, the aluminum-substituted YIG precursor film has a crystallization temperature of approximately 680° C., which temperature is approximately 20° C. lower than that of a YIG precursor film containing no aluminum. Therefore, the use of an aluminum-substituted YIG precursor film is advantageous in view of preventing softening of the substrate 11. The decrease in the heat treatment temperature is also advantageous in that the growth of crystal grains in the film is restrained. As a result, the thus obtained aluminum-substituted YIG film has a grain size which is approximately one half of the grain size of a YIG film of the non-aluminum-substituted type. Accordingly, the aluminum-substituted YIG film provides an improved surface smoothness, and an improved noise-level reduction.

Figure 9A:
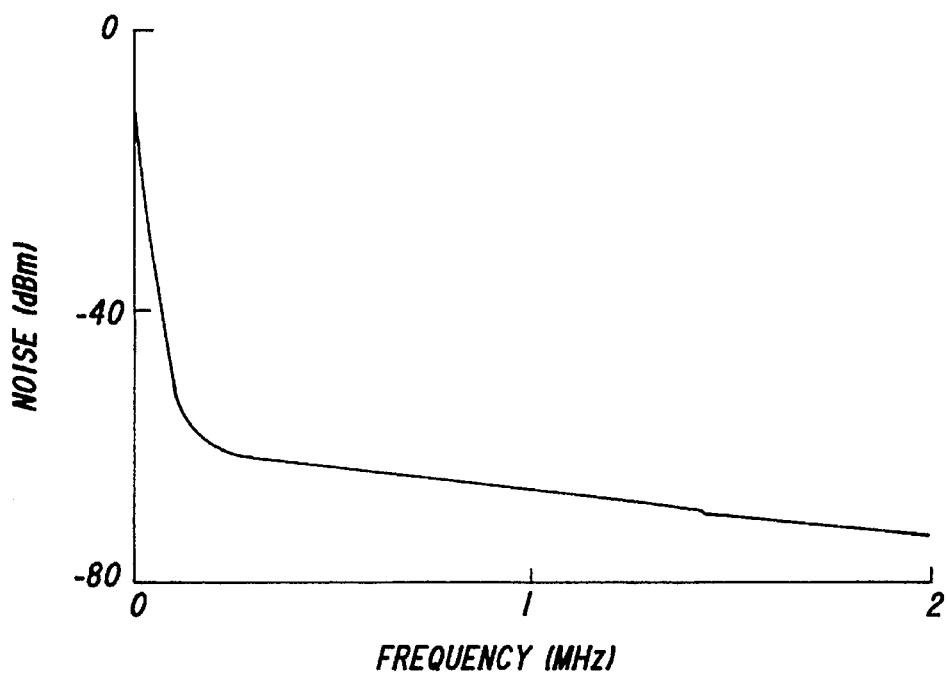
FIG. 9(a) is a graph showing the noise spectrum of an aluminum-substituted YIG film crystallized under heat treatment conditions according to the present invention.
Figure 11:
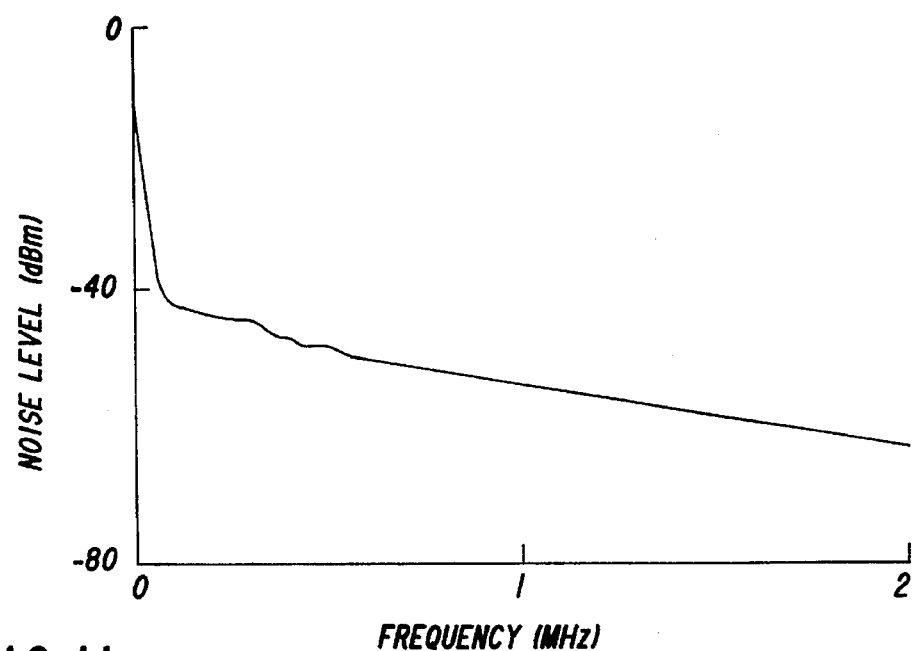
FIG. 11 is a graph showing the noise spectrum of a YIG film formed on a glass substrate by a conventional method.

FIG. 9(a) shows the noise spectrum evaluated by forming a 0.1 μm-thick aluminum reflecting film 14a over the aluminum-substituted YIG film. In this evaluation, noise was measured by using a spectrum analyzer and under the following conditions: A light source comprising an argon laser of a wavelength of 514 nm was used; a frequency band-width of 30 kHz was used; and a relative linear velocity of 2.5 m/sec of a laser beam scanning the surface being measured. When the data shown in FIG. 9(a) is compared with the noise spectrum data shown in FIG. 11 concerning a YIG underlayer formed by a conventional method, noise levels at 1 MHz are −65 dBm and −54 dBm, respectively. Thus, according to the second embodiment, the noise level is reduced by approximately 11 dBm.

A magneto-optical recording medium according to the second embodiment is completed by subsequently forming, on an underlayer 12 comprising the crystallized aluminum-substituted YIG film, a bismuth-substituted garnet recording layer 14 and an aluminum reflecting films 14a by a method similar to that in the first embodiment.

Examples of underlayers 12 of the second embodiment which may be used include, in addition to the aluminum-substituted YIG film, another YIG film in which iron is substituted by indium (In) or scandium (Sc).

Figure 3:
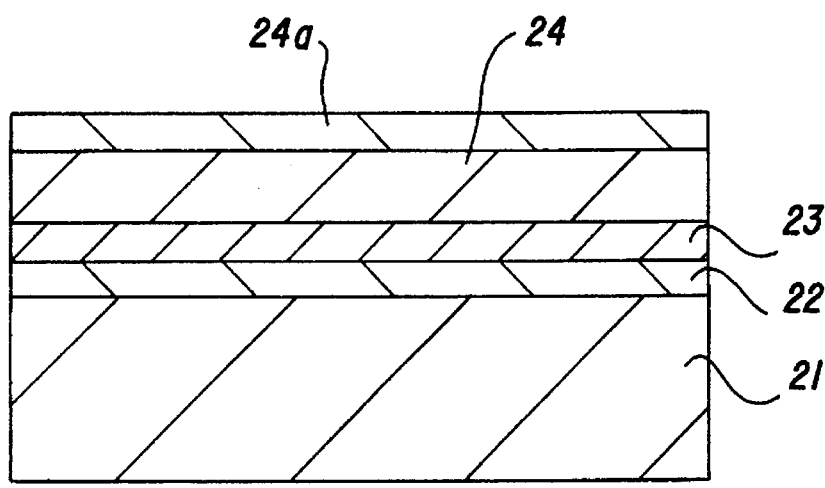
FIG. 3 is a schematic sectional view of a magneto-optical recording medium according to a third embodiment of the present invention.

FIG. 3 shows, in a schematic sectional view, a magneto-optical recording medium according to a third embodiment of the present invention. The magneto-optical recording medium has an amorphous substrate 21 made of a glass, a first sub-underlayer 22 made of a crystalline YIG, a second sub-underlayer 23 made of a nonmagnetic garnet, and a recording layer 24 made of a bismuth-substituted garnet, the first and second sub-underlayers 22 and 23 (together constituting an underlayer) and the recording layer 24 being subsequently formed on one surface of the substrate 21. The recording layer 24 is covered with an aluminum reflecting film 24a formed thereon.

The magneto-optical recording medium shown in FIG. 3 was produced by the following processes:

A yttrium-iron-garnet (YIG) precursor film having a thickness of 0.1 μm and a chemical composition expressed as $Y_3Fe_5O_{12}$ was deposited by a sputtering method on one surface of a substrate 21 made of aluminosilicate glass, as those of the first and second embodiments. The YIG precursor film was amorphous. The sputtering was effected under conditions mainly comprising the following: A radio-frequency magnetron sputtering apparatus was used; a sputtering atmosphere comprising 1.3 Pa argon was used; a substrate temperature during sputtering of 300° C. was used; and a high-frequency power of 400 W was supplied.

The substrate 21, on the surface of which the YIG precursor film had been formed, was heat-treated by a heating apparatus 5 such as that shown in FIG. 5 and in accordance with the temperature profile shown in FIG. 6(a), thereby converting the precursor film into a crystalline YIG film.

Subsequently, a second sub-underlayer 23 having a thickness of 20 nm and a chemical composition of $Bi_2DyGa_2Fe_3O_{12}$, and a 0.12 μm-thick recording layer 24 made of a bismuth-substituted garnet having a chemical composition of $Bi_2DyGa_{0.8}Fe_{4.2}O_{12}$ were subsequently formed on the thus crystallized YIG film by a sputtering method at a substrate temperature of, for example 550° C. The sputtering employed the same conditions as those of the sputtering for forming the recording layer 4 in the first embodiment. This sputtering may be such that the second sub-underlayer 23 is temporarily exposed to air in order, for example, to replace the target, and thereafter, the recording layer 24 is deposited by effecting sputtering. Needless to say, the second sub-under layer 23 and the recording layer 24, each made of a bismuth-substituted garnet, are crystalline even if they are not subjected to post heat-treatment. Subsequently, a 0.1 μm-thick aluminum reflecting film 24a is formed on the recording layer 24, thereby completing a magneto-optical recording medium according to the third embodiment.

Figure 9B:
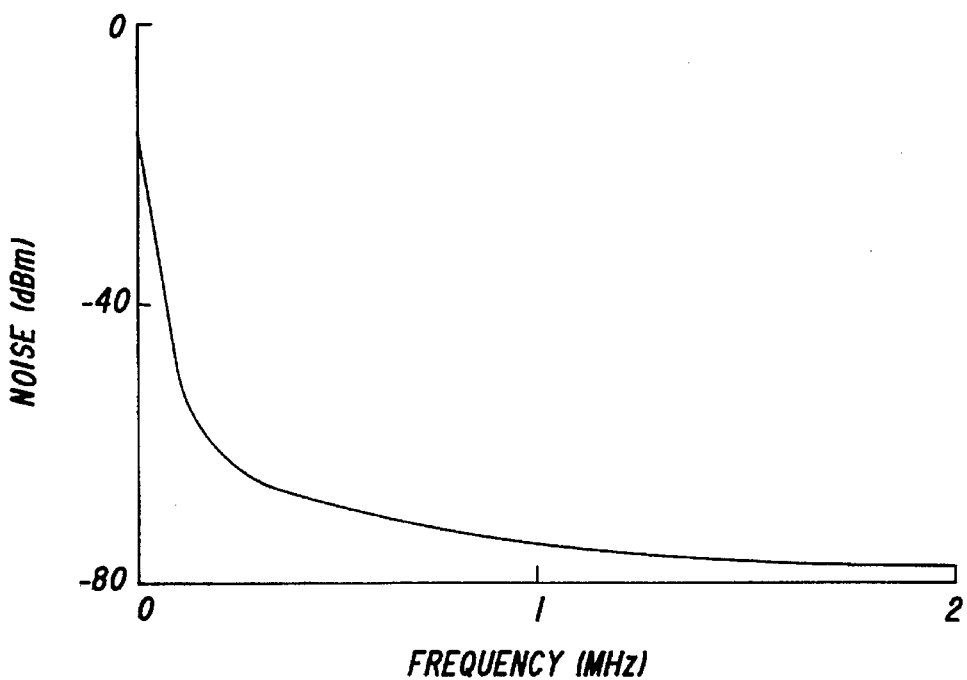
FIG. 9(b) is a graph showing the noise spectrum of the magneto-optical recording medium shown in FIG. 3.

FIG. 9(b) shows the noise spectrum evaluated concerning a magneto-optical recording medium of the type shown in FIG. 3 which has an underlayer of a double-layer structure. In this evaluation, noise was measured by using a spectrum analyzer and under the same conditions as those described in the second embodiment. When the data shown in FIG. 9(b) is compared with the noise spectrum data shown in FIG. 11 concerning a YIG underlayer formed by a conventional method, noise levels at 1 MHz are −74 dBm and −53 dBm, respectively. Thus, according to the third embodiment, the noise level is reduced by approximately 20 dBm.

The bismuth-substituted garnet forming the second sub-underlayer 23 of the third embodiment has nonmagnetic properties at normal temperature. Accordingly, the second sub-underlayer 23 is advantageous in that it is able to prevent magnetic exchange interaction between the first sub-underlayer 22 and the recording layer 24. This advantage will be described with reference to FIGS. 10(a) and 10(b).

Figure 10A:
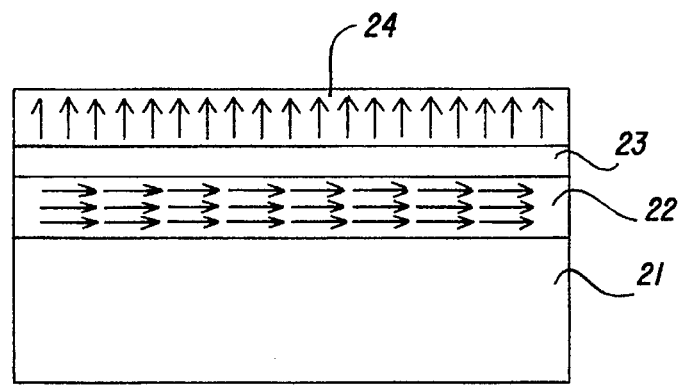
FIGS. 10(a) and 10(b) are schematic sectional views for illustrating the action of a nonmagnetic sub-layer formed between a YIG sub-layer and a bismuth-substituted garnet recording layer.
Figure 10B:
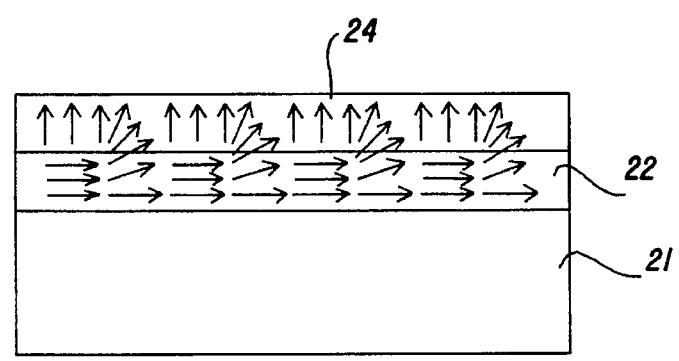

FIGS. 10(a) and 10(b) respectively correspond to the case where the nonmagnetic sub-underlayer 23 is provided and the case where the nonmagnetic sub-underlayer 23 is not provided. The arrows shown in these drawings indicate directions of magnetization.

A YIG film formed on an amorphous substrate, such as a glass substrate, generally has a direction of magnetization that is parallel to the surface of the substrate. On the other hand, a recording layer 24 of a magneto-optical recording medium must possess a direction of magnetization that is perpendicular to the surface of the substrate. When there is no second sub-underlayer 23, the first sub-underlayer 22 comprising a YIG film directly contacts the recording layer 24 comprising a bismuth-substituted garnet film, as shown in FIG. 10(b), so that a magnetic exchange interaction occurs between the sub-layer 23 and the layer 24. As a result, in the interface between the sub-underlayer 23 and the recording layer 24, there are regions where the direction of magnetization changes continuously. Such a distribution of magnetization effects "fluctuation" of Faraday rotation, which in turn increases the level of noise.

On the other hand, when the nonmagnetic second sub-underlayer 23 is provided, the sub-underlayer 23 serves to prevent magnetic exchange interaction between the YIG sub-underlayer 22 and the bismuth-substituted garnet recording layer 24. As a result, as shown in FIG. 10(a), the interface between the sub-layer 23 and the layer 24 is free from regions where the direction of magnetization changes continuously, so that increases in the "fluctuation" are prevented. By virtue of this arrangement, a noise-level reduction of 20 dB in total has been achieved.

The second sub-underlayer 23 may not comprise a bismuth-substituted garnet film. For example, the sub-underlayer 23 may comprise a film of a garnet which is nonmagnetic at normal temperature and which is expressed by the chemical formula: $R_3M_zFe_{5-z}O_{12}$ (where R represents yttrium or a rare-earth element; M represents a nonmagnetic metallic element selected from the third group of the periodic table; and $z \geq 1.5$), such as a film having a chemical composition expressed as $Y_3Ga_2Fe_3O_{12}$.

Figure 4:
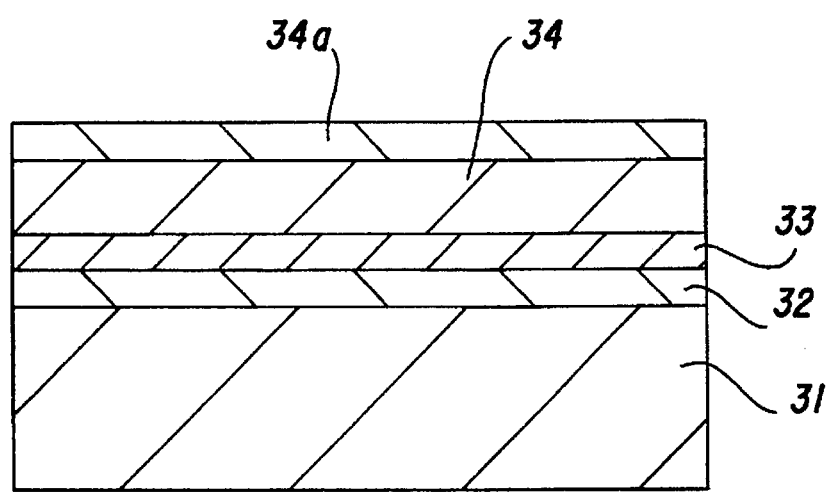
FIG. 4 is a schematic sectional view of a magneto-optical recording medium according to a fourth embodiment of the present invention.

FIG. 4 shows, in a schematic sectional view, a magneto-optical recording medium according to a fourth embodiment of the present invention. The magneto-optical recording medium has an amorphous substrate 31 made of a glass, a first sub-underlayer 32 made of a crystalline aluminum-substituted YIG, a second sub-underlayer 33 made of a nonmagnetic garnet, and a recording layer 34 made of a bismuth-substituted garnet, the first and second sub-underlayers 32 and 33 (together constituting an underlayer) and the recording layer 34 being subsequently formed on one surface of the substrate 31. The recording layer 34 is covered with an aluminum reflecting film 34a formed thereon.

The magneto-optical recording medium shown in FIG. 4 was produced by the following processes:

An aluminum-substituted YIG precursor film having a thickness of 0.1 μm and a chemical composition expressed as $Y_3Al_zFe_{z-5}O_{12}$ was deposited by a sputtering method on one surface of a substrate 31 made of aluminosilicate glass, as those of the first to third embodiments. The YIG precursor film was amorphous. The sputtering was effected under conditions comprising substantially the same conditions as those in the second embodiment. The substrate 31, on the surface of which the aluminum-substituted YIG precursor film had been formed, was heat-treated by a heating apparatus 5 such as that shown in FIG. 5 and in accordance with the temperature profile shown in FIG. 6(a), thereby converting the precursor film into a crystalline aluminum-substituted YIG film. The heat treatment employed the same conditions as those in the second embodiment. Thus, a first sub-underlayer 32 comprising an aluminum-substituted YIG film was formed.

Subsequently, a second sub-underlayer 33 having a thickness of 20 nm and a chemical composition of $Bi_2DyGa_2Fe_3O_{12}$, and a 0.12 μm-thick recording layer 34 made of a bismuth-substituted garnet having a chemical composition of $Bi_2DyGa_{0.8}Fe_{4.2}O_{12}$ were subsequently formed on the first sub-underlayer 32 by a sputtering method at a substrate temperature of, for example, 550° C. The sputtering employed the same conditions as those of the third embodiment. This sputtering may be such that the second sub-underlayer 33 is temporarily exposed to air in order, for example, to replace the target, and thereafter, the recording layer 34 is deposited by effecting sputtering.

Needless to say, the second sub-under layer 33 and the recording layer 34, each made of a bismuth-substituted garnet, are crystalline even if they are not subjected to post heat treatment. Subsequently, a 0.1 μm-thick aluminum reflecting film 34a is formed on the recording layer 34, thereby completing a magneto-optical recording medium according to the fourth embodiment.

The fourth embodiment includes a first sub-underlayer 32 formed by using an aluminum-substituted YIG precursor film. The use of this type of YIG precursor film is advantageous in view of preventing softening of the substrate 31, as has been described concerning the second embodiment. The decrease in the heat treatment temperature is also advantageous in that the growth of crystal grains in the film is restrained. As a result, the thus obtained aluminum-substituted YIG film has a grain size which is approximately one half of the grain size of a YIG film of the non-aluminum-substituted type. Accordingly, the aluminum-substituted YIG film provides an improved surface smoothness, and an improved noise-level reduction.

Another advantageous feature of the fourth embodiment is that the second sub-underlayer 33 made of a nonmagnetic garnet and provided between the first sub-underlayer 32 and the recording layer 34 serves to prevent magnetic exchange interaction between the sub-layer 32 and the layer 34, thereby reducing noise due to "fluctuation" of Faraday rotation. As a result, a magneto-optical recording medium according to the fourth embodiment is able to reduce, as is that of the third embodiment, the level of noise by approximately 20 dB from the noise level obtainable with a YIG underlayer formed by a conventional method.

Similarly to the case of the third embodiment, the second sub-underlayer 33 may not comprise a bismuth-substituted garnet film, and may alternatively comprise, for example, a film of a garnet which is nonmagnetic at normal temperature and which is expressed by the chemical formula: $R_3M_zFe_{5-z}O_{12}$ (where R represents yttrium or a rare-earth element; M represents a nonmagnetic element selected from the third group of the periodic table; and $z \geq 1.5$), such as a film having a chemical composition expressed as $Y_3Ga_2Fe_3O_{12}$.

Needless to say, each of the second to fourth embodiments may include an amorphous substrate made of borosilicate glass.

We claim:

1. A magneto-optical recording medium comprising:

an amorphous substrate which is transparent to laser light;

a first layer formed on a surface of the substrate, the first layer being amorphous and having a chemical composition corresponding to a first garnet;

a second layer formed on the first layer, the second layer being composed of crystals of a second garnet having a crystallization temperature lower than the softening point of the substrate and an average surface roughness of less than 40 Å; and a third layer formed on the second layer, the third layer being composed of a bismuth garnet having it axis of easy magnetization perpendicular to the surface of the substrate.

2. A magneto-optical recording medium according to claim 1, wherein the second garnet has a crystallization temperature lower than the crystallization temperature of the first garnet.

3. A magneto-optical recording medium according to claim 2, wherein the second garnet has the formula $A_xY_{3-x}Fe_5O_{12}$, where $0 \leq x \leq 3$ and A is a rare earth element.

4. A magneto-optical recording medium according to claim 3, wherein the first garnet in the first layer has the formula $A_xY_{3-x}Ga_5O_{12}$, where $0 \leq x \leq 3$ and A is a rare earth element.

5. A magneto-optical recording medium comprising:

an amorphous substrate which is transparent to laser light;

a first layer formed on a surface of the substrate, the first layer being composed of a magnetic garnet having a crystallization temperature lower than the softening point of the substrate;

a second layer formed on the first layer, the second layer being composed of a non-magnetic garnet having a crystallization temperature lower than the softening point of the substrate and an average surface roughness of less than 40 Å; and a third layer formed on the second layer, the third layer being composed of a bismuth garnet having it axis of easy magnetization perpendicular to the surface of the substrate.

6. A magneto-optical recording medium according to claim 5, wherein the garnet forming the second layer has the formula $A_xY_{3-x}Ga_zFe_{5-z}O_{12}$, where A indicates a rare earth element, $0 \leq x \leq 3$ and $1.5 \leq z \leq 5$.

7. A magneto-optical recording medium according to claim 5, wherein the non-magnetic garnet is a bismuth garnet of a formula $Bi_xR_{3-x}Ga_zFe_{5-z}O_{12}$, where $0 < x < 3$, $1.5 \leq z < 5$ and R is a rare earth element.

8. A magneto-optical recording medium according to claim 5, wherein the garnet forming the first layer is composed of an aluminum garnet.

9. A magneto-optical recording medium according to claim 1 or 5, wherein the bismuth garnet in the third layer has the formula $Bi_xR_{3-x}Ga_zFe_{5-z}O_{12}$, where $0 < x < 3$, $0 \leq z < 1$ and R is a rare earth element.

10. A magneto-optical recording medium according to claim 1 or 5, wherein the amorphous substrate is an aluminosilicate glass or a borosilicate glass.

11. A magneto-optical recording medium comprising:

an amorphous substrate which is transparent to laser light;

a first layer formed on a surface of the substrate, the first layer being composed of a magnetic garnet having a crystallization temperature lower than the softening point of the substrate and its axis of easy magnetization in parallel to the surface of the substrate;

a second layer formed on the first layer, the second layer being composed of a non-magnetic garnet having a crystallization temperature lower than the softening point of the substrate and an average surface roughness less than 40 Å; and a third layer formed on the second layer, the third layer being composed of a bismuth garnet and having its axis of easy magnetization perpendicular to the surface of the substrate.

* * * * *